(12) United States Patent
Prabhakar et al.

(10) Patent No.: US 11,971,846 B2
(45) Date of Patent: *Apr. 30, 2024

(54) LOGIC UNIT FOR A RECONFIGURABLE PROCESSOR

(71) Applicant: SambaNova Systems, Inc., Palo Alto, CA (US)

(72) Inventors: Raghu Prabhakar, San Jose, CA (US); Manish K. Shah, Austin, TX (US); Ram Sivaramakrishnan, San Jose, CA (US); Pramod Nataraja, San Jose, CA (US); David Brian Jackson, Dana Point, CA (US); Gregory Frederick Grohoski, Bee Cave, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,817

(22) Filed: Feb. 14, 2023

(65) Prior Publication Data

US 2023/0195686 A1   Jun. 22, 2023

Related U.S. Application Data

(63) Continuation of application No. 17/492,403, filed on Oct. 1, 2021, now Pat. No. 11,580,056, which is a continuation of application No. 16/407,675, filed on May 9, 2019, now Pat. No. 11,386,038.

(51) Int. Cl.
*G06F 15/80* (2006.01)
*G06F 9/52* (2006.01)
*G06F 15/173* (2006.01)
*G06F 15/78* (2006.01)

(52) U.S. Cl.
CPC .......... *G06F 15/7867* (2013.01); *G06F 9/522* (2013.01); *G06F 15/17325* (2013.01); *G06F 15/80* (2013.01)

(58) Field of Classification Search
CPC ...... G06F 15/7867; G06F 9/522; G06F 13/20; G06F 15/17325; G06F 15/80; G06F 2213/40; G06F 15/8007
See application file for complete search history.

*Primary Examiner* — Corey S Faherty
(74) *Attorney, Agent, or Firm* — Flagship Patents; Sikander M. Khan; Bruce A. Young

(57) ABSTRACT

A logic unit in an array of processing units is configurable to consume source tokens and a status signal and to produce barrier tokens and an enable signal based on the source tokens and the status signal.

10 Claims, 7 Drawing Sheets

LOGIC UNIT FOR A RECONFIGURABLE PROCESSOR

PRIORITY CLAIMS

This application is a continuation application of patent application Ser. No. 17/492,403, entitled, "CONTROL BARRIER NETWORK FOR RECONFIGURABLE DATA PROCESSORS," filed on Oct. 1, 2021, which is a continuation application of patent application Ser. No. 16/407,675, entitled, "CONTROL FLOW BARRIER AND RECONFIGURABLE DATA PROCESSOR", now U.S. Pat. No. 11,386,038. The priority applications are hereby incorporated by reference herein for all purposes.

BACKGROUND

Technological Field

The present technology relates to configuration of reconfigurable architectures, can be particularly applied to control flow logic for coarse-grain reconfigurable architectures and other distributed execution systems.

Description of Related Art

Reconfigurable processors, including field programmable gate arrays (FPGAs), can be configured to implement a variety of functions more efficiently or faster than might be achieved using a general purpose processor executing a computer program. So-called coarse-grain reconfigurable architectures (e.g. CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

In CGRAs and other processing systems that comprise a plurality of processing units that participate in a data processing operation, part of the data processing operation to be executed in one processing unit may need to be synchronized with other parts being executed in processing units distributed across the system. For example, several parts of the data processing operation may need to complete before a next part can safely begin. Thus, techniques for distributing control signals among elements of the processing system are required.

In order to maximize operating efficiency, and to be able to coordinate among processing units on a processing system, a means of efficiently managing control signaling is needed.

SUMMARY

A technology is described which enables efficient control signaling among processing units of a data processing system, including among reconfigurable processing units of a Coarse-Grained Reconfigurable Array processor.

A processing system is described that comprises an array of processing units arranged to perform execution fragments of a data processing operation. A processing unit in the array is arranged to respond to an enable signal to enable execution of an execution fragment by the processing unit, and generates a status signal usable to indicate status of the execution fragment performed in the processing unit. A control barrier network is coupled to processing units in the array. The control barrier network comprises a control bus configurable to form signal routes in the control barrier network; and a plurality of control barrier logic units having inputs and outputs connected to the control bus and to the array of processing units.

The control barrier network is configurable in configurable and reconfigurable architectures to provide signal routing suitable to support complex data processing operations in an array of configurable units, including for example in configurable units of a Coarse-Grained Reconfigurable Array processor.

The control barrier network provides the ability to register or record inbound tokens and status signals from several distinct sources, which can be defined in configuration data, and produce output barrier tokens, and other signals, based on specified combinations of the inbound tokens and status signals. Examples described herein are flexible enough to support control barriers across an arbitrary number of sources by decomposing the barrier logic into multiple levels.

The logic units in the plurality of control barrier logic units are configurable in technology described herein to consume source tokens and status signals on the inputs by, for example, registering the source tokens and status signals on the inputs. The logic units in the plurality of control barrier logic units are configurable in technology described herein to produce barrier tokens on the outputs based on the consumed source tokens and status signals. Also, the logic units can produce enable signals for the array of processing units based on the source tokens and status signals on the inputs.

The control bus can comprise a configurable interconnect configurable by configuration data to connect lines on the control bus carrying barrier tokens produced on the outputs of control barrier logic units to inputs of logic units that consume source tokens. The control bus can be configurable to form signal routes connecting the barrier token output of one logic unit in the plurality of logic units as a source token to inputs of more than one logic unit in the plurality of logic units. The control bus can be configurable to form signal routes providing barrier tokens sourced from more than one logic unit in the plurality of logic units to inputs of one logic unit in the plurality of logic units.

A control barrier logic unit in the plurality of logic units can be operatively coupled to, or a part of, an associated processing unit in the array of processing units.

In a technology described herein, the logic unit includes a token store having inputs and outputs; a configurable input circuit configurable to connect selected lines in the control bus and to a status signal line of the associated processing unit to inputs of the token store; and a barrier token output circuit configurable to provide a barrier token to the control bus in response to a first configurable combination of the outputs of the token store.

A logic unit in the plurality of logic units can include a feedback circuit configurable to provide a feedback signal in response to a second configurable combination of the outputs of the token store, to clear the token store. In some embodiments, the first and second configurable combinations can be the same. The logic units can include an enable signal output circuit to provide an enable signal for an associated configurable unit in response to a third configurable combination of the outputs of the token store. In some embodiments, the first and third configurable combinations can be the same.

In some embodiments, the processing system includes a data bus interconnecting the array of processing units, separate from the control bus. In a technology described herein, the data bus comprises a packet switched network and the control bus is configurable to form signal routes that are static during execution of corresponding execution fragments. In other embodiments, the control bus may be a packet-switched network. In still other embodiments, the control bus and data bus may operate on the same physical network, on different virtual channels.

Other aspects and advantages of the technology described herein can be seen on review of the drawings, the detailed description and the claims, which follow.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1:
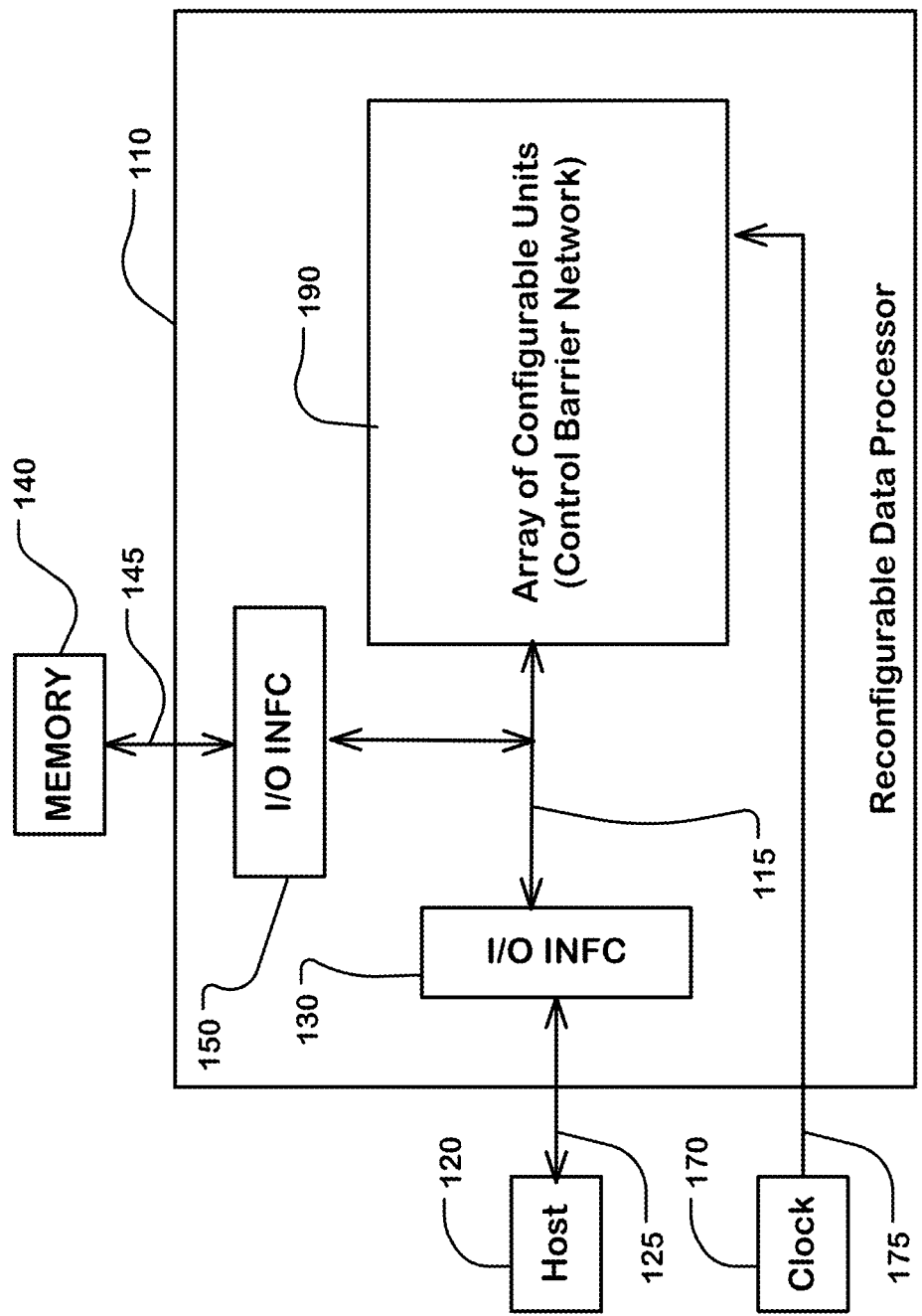
FIG. 1 is a system diagram illustrating a system including a host, a memory, and a reconfigurable data processor including a control barrier network.

FIG. 1 is a system diagram illustrating a system including a host 120, a memory 140, and a reconfigurable data processor 110. As shown in the example of FIG. 1, the reconfigurable data processor 110 includes an array 190 of configurable units that includes a control barrier network as described herein.

The processor 110 includes an external I/O interface 130 connected to the host 120 by lines 125, and external I/O interface 150 connected to the memory 140 by lines 145. The I/O interfaces 130, 150 connect via a bus system 115 to the array 190 of configurable units. The bus system 115 may have a bus width of carrying one chunk of data which can be, for this example, 128 bits (references to 128 bits throughout can be considered as an example chunk size more generally).

To configure configurable units in the array 190 of configurable units with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the configurable processor 110. The configuration file can be retrieved from the memory 140 via the memory interface 150. Chunks of the configuration file can then be sent in a distribution sequence to configurable units in the array 190 of configurable units in the reconfigurable data processor 110.

An external clock generator 170 or other clock signal sources can provide a clock signal 175 or clock signals to elements in the reconfigurable data processor 110, including the array 190 of configurable units, and the bus system 115, and the external data I/O interfaces.

The configurable units in the array 190 can be configured to execute execution fragments of a data processing operation for which the configuration file of the array 190 is designed. In one embodiment, execution fragments ("EFs") consist of portions of a program representing an amount of work. An EF may consist of computations encompassed by a set of loops, or a set of graph nodes, or may be some other unit of work at which synchronization is required. EFs may consist of a fixed or variable amount of work, as suits the program; similarly, different EFs may contain different amounts of computation. EFs may represent parallel patterns, or portions of parallel patterns.

The control barrier network is configurable to establish control signal routes among the configurable units usable for coordination of the execution fragments. The control barrier network is configurable in configurable and reconfigurable architectures to provide signal routing suitable to support complex data processing operations in an array of configurable units, including for example in configurable units of a CGRA processor.

The control barrier network provides the ability to register or record inbound tokens and status signals from several distinct sources on the CGRA, which can be defined in a configuration data store, and produce output barrier tokens, and other signals, based on specified combinations of the inbound tokens and status signals. Examples described herein are flexible enough to support control barriers across an arbitrary number of sources by decomposing the barrier logic into multiple levels.

A control barrier network as described herein can be utilized with other types of data processors that include an array of processing units which perform execution fragments that may require coordination for the purposes of a broader data processing operation.

Figure 2A:
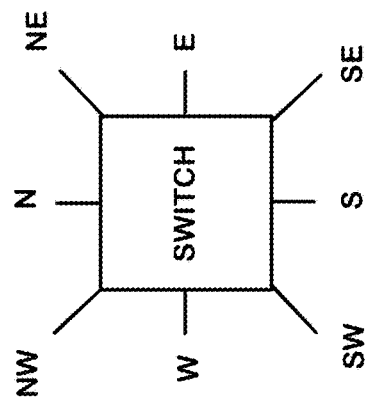
FIG. 2A illustrates an example switch unit connecting elements in an array level network.
Figure 2:
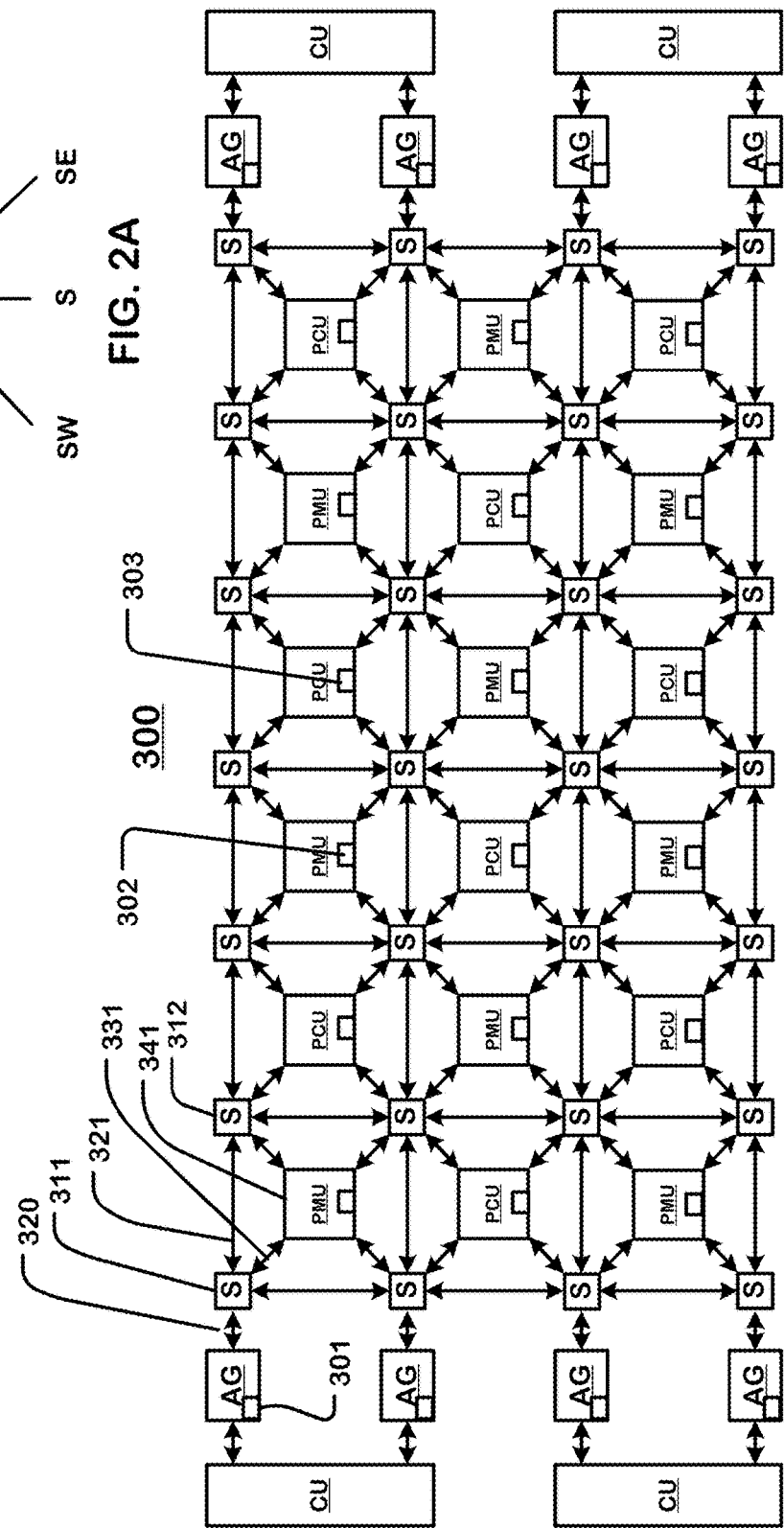
FIG. 2 is a simplified diagram of a tile comprising an array of configurable units with associated barrier logic units.

FIG. 2 is a simplified diagram of a tile that comprises an array of configurable units, where the configurable units in the array are nodes on a data bus system.

In this example, the array of configurable units 300 includes a plurality of types of configurable units. The types of configurable units, in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops storing configuration data that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store a status usable to track progress in nested loops or otherwise. A configuration file contains a bit stream representing the initial configuration, or starting state, of each of the components that execute the program. This bit stream is referred to as a bit file. Program Load is the process of setting up the configuration stores in the array of configurable units based on the contents of the bit file to allow all the components to execute a program (i.e., a machine). Program Load may also require the load of all PMU memories.

The bus system includes links interconnecting configurable units in the array. The links in the array level network include one or more, and in this case two, kinds of physical data buses: a chunk-level vector bus (e.g. 128 bits of data), and a word-level scalar bus (e.g. 32 bits of data). For instance, interconnect 321 between switch units 311 and 312 includes a vector bus interconnect with vector bus width of 128 bits, and a scalar bus interconnect with a scalar bus width of 32 bits. Also a control bus (see FIG. 3) that can comprise a configurable interconnect is included carrying multiple control bits on signal routes designated by configuration bits in the configuration file for the tile. The control bus can comprise physical lines separate from the data buses in some embodiments. In other embodiments, the control bus can be implemented using the same physical lines with a separate protocol or in a time sharing procedure.

The physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g. the row and column in the array), and an interface identifier that identifies the interface on the destination switch (e.g. North, South, East, West, etc.) used to reach the destination unit.

FIG. 2A illustrates an example switch unit connecting elements in an array level network. As shown in the example of FIG. 2A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. Two switch units in each tile quadrant have connections to an Address Generation unit and Coalescing Unit (AG CU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of an execution fragment of a machine after configuration, data can be sent via one or more unit switches and one or more links between the unit switches to the configurable units using the vector bus and vector interface(s) of the one or more switch units on the array level network.

A data processing operation implemented by configuration of a tile comprises a plurality of execution fragments of the data processing operation which are distributed among and executed by corresponding configurable units (AGs, CUs, PMUs, PCUs in this example).

A control barrier network in this example comprises a plurality of configurable control barrier logic units coupled with the configurable units in the array. In this example, the plurality of control barrier logic units include control barrier logic units (e.g. 301) in or operatively coupled to the address generators AG, control barrier logic units (e.g. 302) in the PMUs and control barrier logic units (e.g. 303) in the PCUs. The control barrier network for a given data processing operation can be configured to enforce relationships among the execution fragments, to coordinate timing of the ending and the beginning of the performance of the execution fragments distributed across the tile.

Figure 3:
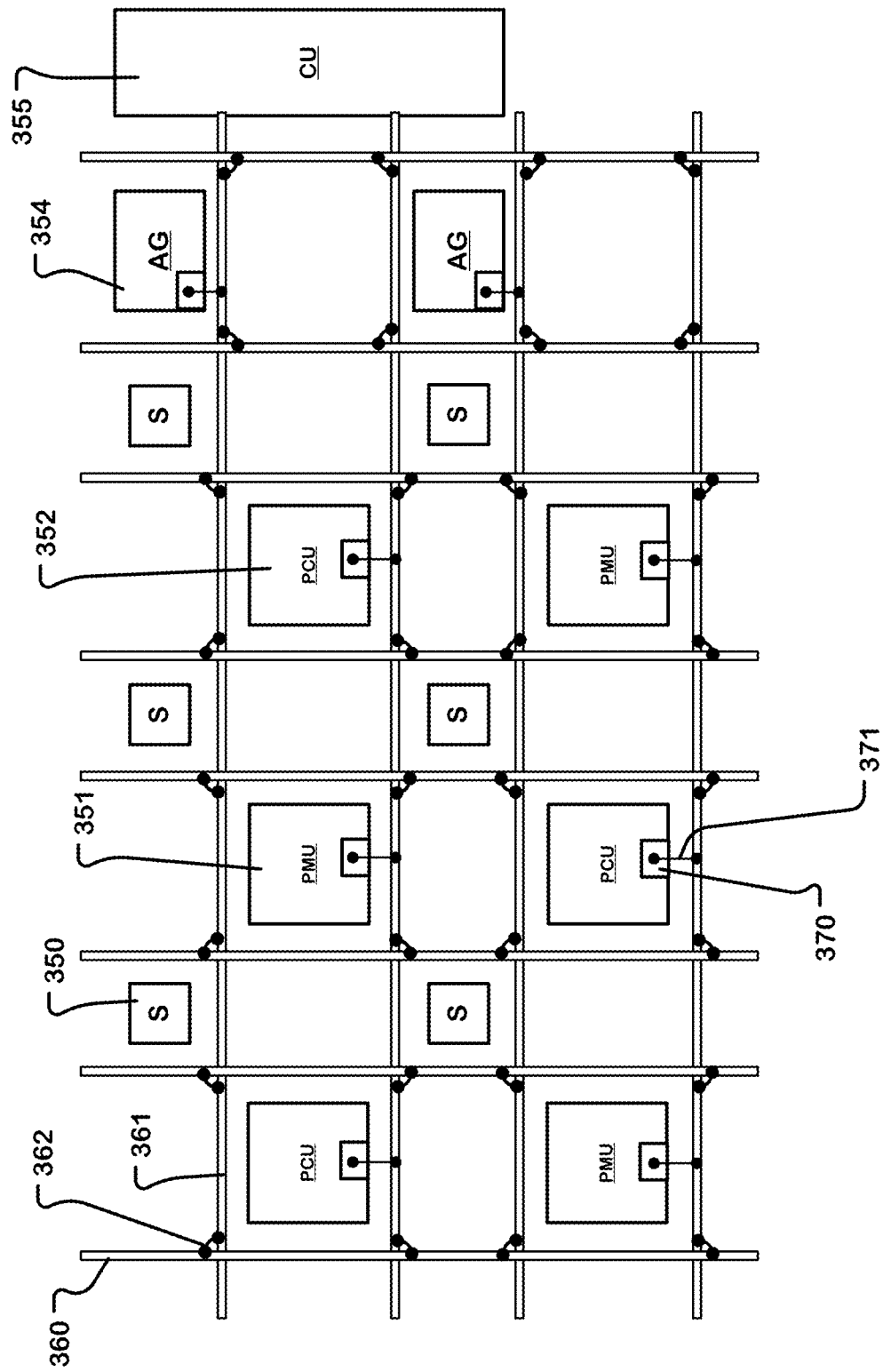
FIG. 3 is a diagram of a portion of a tile like that of FIG. 2 illustrating a configurable interconnect connected to control barrier logic units in the tile.

The control barrier logic units are connected to a control bus that, in this example, is implemented using a configurable interconnect (not shown—see FIG. 3). The control bus can be configured using configuration data to form signal routes among the control barrier logic units in the tile supporting a particular configuration of the tile designed for performing a data processing operation.

In one embodiment, the configurable units include configuration and status registers holding unit configuration files loaded in a configuration load process, or unloaded in a configuration unload process. The registers can be connected in a serial chain and can be loaded through a process of shifting bits through the serial chain. In some embodiments, there may be more than one serial chain arranged in parallel or in series. When a configurable unit receives the, for example, 128 bits of configuration data in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface.

A configuration file or bit file, before configuration of the tile, can be sent using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 341 can be sent to the PMU 341, via a link 320 between a load controller in the address generator AG and the West (W) vector interface of the switch unit 311, the switch unit 311, and a link 331 between the Southeast (SE) vector interface of the switch unit 311 and the PMU 341. Configuration data for the control barrier network can be included in the configuration data for associated configurable units, or provided via other configuration data structures.

The configurable units interface with the memory through multiple memory interfaces. Each of the memory interfaces can be accessed using several AGCUs. Each AGCU contains a reconfigurable scalar datapath to generate requests for the off-chip memory. Each AGCU contains FIFOs (first-in-firstout buffers for organizing data) to buffer outgoing commands, data, and incoming responses from the off-chip memory.

Configuration files can be loaded to specify the configuration of the tile including control barrier logic units and the control bus, for the purposes of particular data processing operations, including execution fragments in the configurable units, interconnect configurations and control barrier network configurations. Technology for coordinating the loading and unloading of configuration files is described in commonly owned U.S. patent application Ser. No. 16/197, 826, filed Nov. 21, 2018, entitled Configuration Load of a Reconfigurable Data Processor, by Shah et al., which is incorporated by reference as if fully set forth herein.

FIG. 3 illustrates a portion of the tile (upper right portion of FIG. 2), with the data network removed, and shows a part of the control bus, including the configurable interconnect usable for forming signal routes among the control barrier logic units. The plurality of configurable units in the illustrated portion of the array includes switches S (e.g. 350), PMUs (e.g. 351), PCUs (e.g. 352), AGs (354) and a CU (355). Control barrier logic units (e.g. 370) are included in configurable units in the array. In this example, all of the configurable units except the switches S and the coalescing unit CU include control barrier logic units. In other examples, different distributions of the control barrier logic units can be utilized, including examples in which the control barrier logic units are connected to more than one configurable unit in the array, and examples in which the control barrier logic units are connected to all the configurable units (e.g. including the S and CU type units in the illustrated example).

The configurable interconnect is illustrated by a grid of vertical conductors (e.g. 360) intersected by horizontal conductors (e.g. 361). Switch boxes (e.g. 362) are set by configuration data to interconnect specific lines or sets of lines in the horizontal conductors with the vertical conductors at each intersection. Likewise, each of the configurable units can include inputs and outputs (not shown) for control signals to be routed using the configurable interconnect that can be configured to connect to particular lines in the horizontal and vertical conductors.

In this embodiment, each of the control barrier logic units (e.g. 370) includes a plurality of inputs and outputs (e.g. 371) which are configurable for connection to particular lines in the horizontal conductors of the interconnect. In the illustration, the connections between the control barrier logic units in the configurable interconnect are made with horizontal conductors in the configurable interconnect. This illustration does not suggest any limitation on the implementation and distribution of configurable connections that can be made with the configurable interconnect and the control barrier logic units.

The configurable switches can be implemented generally using pass gates with control inputs connected to a register storing a bit of the configuration file for the control barrier logic unit. In some embodiments, the configurations form static routes persistent throughout execution of a data processing operation among the inputs and outputs of the control barrier logic units to establish control barrier networks implemented to support particular data processing operations and the execution fragments distributed among the configurable units of the tile to support the data processing operations. In other embodiments, the configurations may form dynamic routes that change according to the phase of execution of the program, or as a result of control flow predicates (if-then-else constructs), or other dynamic, input-dependent operations that represent control-flow-dependent sequencing of execution fragments.

Figure 4:
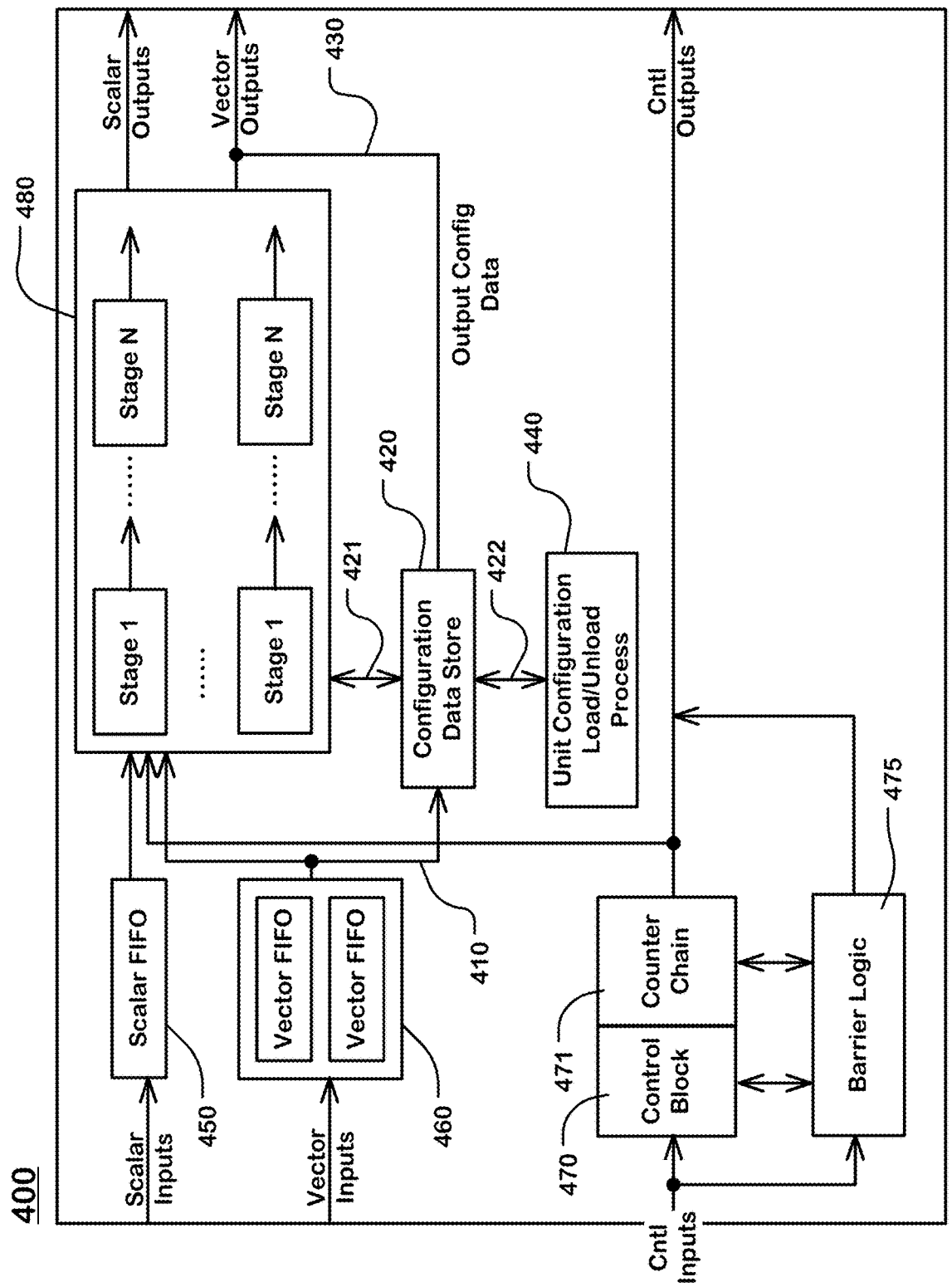
FIG. 4 is a block diagram illustrating an example configurable unit including a barrier logic unit.

FIG. 4 is a block diagram illustrating an example configurable unit 400, such as a Pattern Compute Unit (PCU). Configurable units in the array of configurable units include configuration data stores 420 (e.g. serial chains) to store unit files comprising a plurality of chunks (or sub-files of other sizes) of configuration data particular to the corresponding configurable units and the associated control barrier logic units 475. Configurable units in the array of configurable units each include unit configuration load/unload logic 440 connected to the configuration data store 420 via line 422, to execute a unit configuration load process. The unit configuration load process includes receiving via the bus system (e.g. the vector inputs), chunks of a unit file particular to the configurable unit, and loading the received chunks into the configuration data store 420 of the configurable unit.

The configuration data stores 420 in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

A configurable unit can interface with the scalar, vector, and control buses using three corresponding sets of inputs and outputs (IO): scalar inputs/outputs, vector inputs/outputs, and control inputs/outputs. Scalar IOs can be used to communicate single words of data (e.g. 32 bits). Vector IOs can be used to communicate chunks of data (e.g. 128 bits), in cases such as receiving configuration data in a unit configuration load process, and transmitting and receiving data during operation after configuration across a long pipeline between multiple PCUs. Control IOs can be used to communicate control signals such as the start or end of execution of a configurable unit. Control inputs are received by control block 470, and control outputs are provided by the control block 470.

Each vector input is buffered using a vector FIFO in a vector FIFO block 460 which can include one or more vector FIFOs. Each scalar input is buffered using a scalar FIFO 450. Using input FIFOs decouples timing between data producers and consumers, and simplifies inter-configurable-unit control logic by making it robust to input delay mismatches.

Input configuration data 410 can be provided to a vector FIFO as vector inputs, and then be transferred to the configuration data store 420. Output configuration data 430 can be unloaded from the configuration data store 420 using the vector outputs.

The configurable unit in this example includes multiple reconfigurable datapaths in block 480. A datapath in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each datapath in the configurable unit. The configuration serial chain in the configuration data store 420 is connected to the multiple datapaths in block 480 via lines 421.

The PCU in the illustrated example is designed to execute execution fragments of a data processing operation, which can comprise a single, innermost parallel pattern in an application, or other pattern suitable for control using the control barrier network. The PCU data path can be organized as a multi-stage, reconfigurable SIMD pipeline. This design enables each PCU to achieve high compute density, and exploit both loop level parallelism across lanes and pipeline parallelism across stages. Each stage (Stage 1 . . . Stage N) of each SIMD lane can be composed of a functional unit (FU) and associated pipeline registers. The FUs can for example perform 32 bit word level arithmetic and binary operations, including support for floating point and integer operations. As the FUs in a single pipeline stage operate in SIMD, each stage requires, in an example embodiment, only a single configuration register. Results from each FU are written to its associated register.

Pipeline registers in each lane can be chained together across pipeline stages to allow live values to propagate between stages within the same lane. Cross lane communication between FUs can be captured using two types of intra-PCU networks: a reduction tree network that allows reducing values from multiple lanes into a single scalar, and a shift network which allows using PRs as sliding windows across stages to exploit reuse in stencil applications. Both networks use dedicated registers within PRs to minimize hardware overhead.

Each vector IO (e.g. vector FIFOs 460) allows communicating one word per lane in the PCU, and is used in cases such as reading and writing to scratchpads in PMUs and transmitting intermediate data across a long pipeline between multiple PCUs. Using input FIFOs decouples data producers and consumers, and simplifies inter-PCU control logic by making it robust to input delay mismatches. The FIFOs 450, 460 can generate status signals, such as FIFO empty or FIFO not empty signals, which are connected to the control block 470, and other circuits in the units, and usable to indicate status of an execution fragment, such as whether required input data is available in the FIFO.

Control IO (Cntl Inputs, Cntl Outputs) is connected to a control block 470, and used to communicate control signals such as the start or end of execution of a PCU, or to indicate backpressure.

A reconfigurable chain of counters 471 generates pattern iteration indices and status and control signals that can be used to indicate the status of an execution fragment and can be used to coordinate execution among the elements of the configurable unit. The counter chain 471 for example can generate counter done signals that can be used to indicate the status of the execution fragment, such as whether a loop in the execution fragment is complete.

Execution of an execution fragment in the PCU can be enabled when the control block 470 enables one of the counters. Based on the application's control and data dependencies, the control block can be configured to combine multiple status signals from both local FIFOs and global control inputs to trigger PCU execution. The control block 470 can be implemented using reconfigurable combinational logic and programmable up-down counters for state machines.

Control barrier logic 475 is included in this example of a configurable unit. The barrier logic 475 can be part of the control block 470, or implemented as a separate block on the device. The barrier logic 475 is coupled to the control inputs and to the control outputs. Also, the barrier logic 475 is coupled to the control block 470 and the counter chain 471, for exchanging status signals and control signals in support of a control barrier network configured as discussed above.

A Pattern Memory Unit (e.g. PMU) can contain scratchpad memory coupled with a reconfigurable scalar datapath intended for address calculation and other scalar computations, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU. A PMU can also include a barrier logic unit configured to exchange status and control signals with elements of the PMU, and usable to enable an execution fragment in the PMU. In addition, an address generator AG in this example can also include a barrier logic unit configured to exchange status and control signals with elements of the AG, and usable to enable an execution fragment in the AG.

Figure 5:
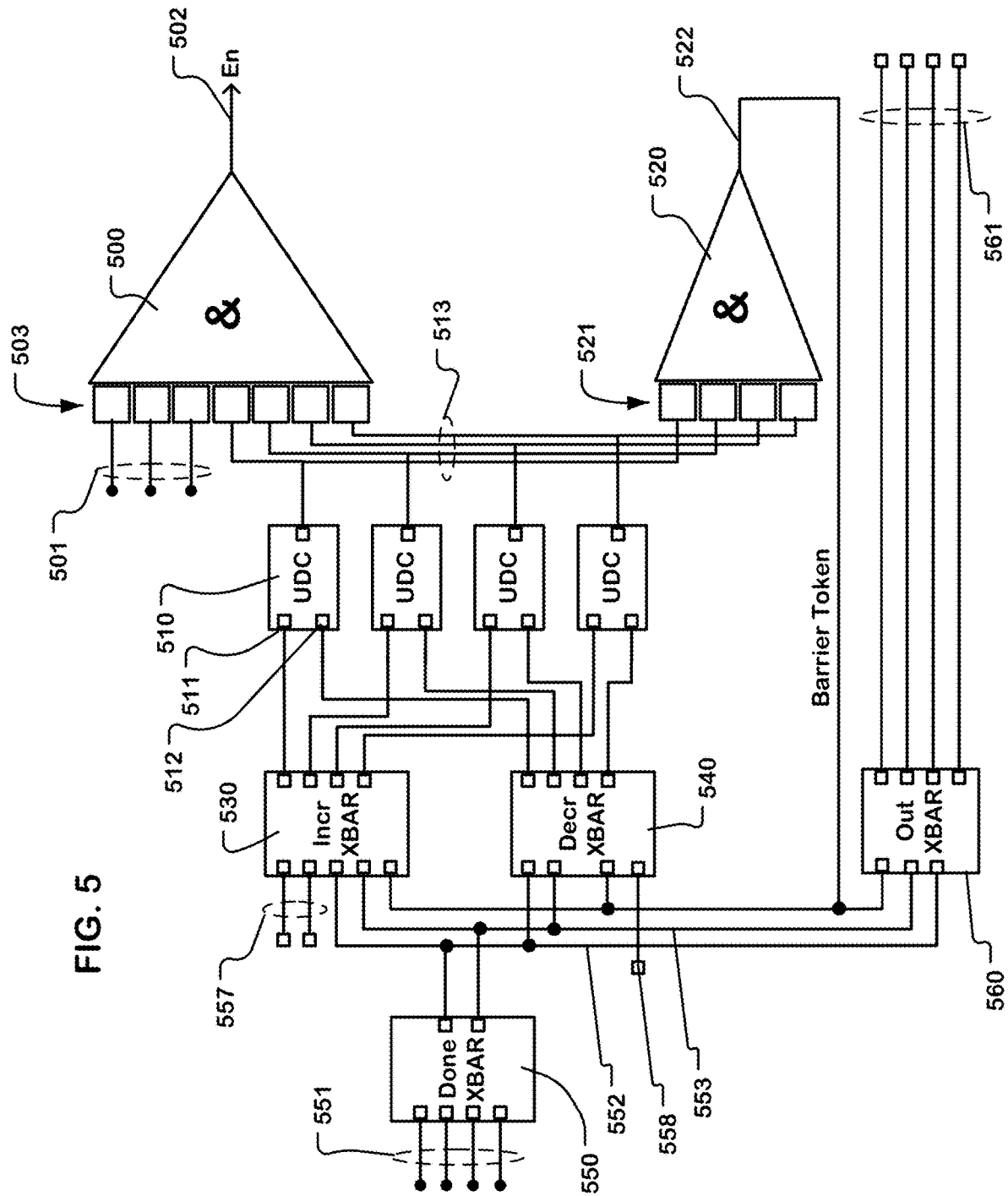
FIG. 5 is a diagram of an implementation of a control barrier logic unit.

FIG. 5 illustrates an example of a control barrier logic unit, usable in an array of configurable units to form a configurable control barrier network as described herein. The example in FIG. 5 is usable for example as the barrier logic 475 of FIG. 4. The barrier logic unit of FIG. 5 includes inputs (e.g. 501, 551, 557) and outputs (e.g. 502, 561) which are connected to the control bus (configurable interconnect of FIG. 3) and an associated configurable unit, such as a PCU, PMU, AG of the examples described above.

The control barrier logic unit includes a token store that comprises in this example a plurality of up/down counters UDC (e.g. 510). In other embodiments, different types of latches, such as set/reset SR latches and the like, can be used to implement the token store. In still other embodiments, various implementations of FIFO buffers can be used to implement the token store. Each of the UDCs has an increment input (e.g. 511) and a decrement input e.g. 512). The increment input can be used to change a logic 0 stored in the UDC to a logic 1, or in other words to set the value in the token store. The decrement input can be used to change the logic 1 stored in the UDC to a logic 0, or in other words to reset the value in the token store.

The token store is coupled to a configurable input circuit, which in this example comprises a plurality of configurable crossbar switches. A status crossbar 550 of the configurable input circuit has inputs 551 connected to signals usable to indicate the status of an execution fragment in a configurable unit in the array. In this example, the status signals can comprise counter done signals from the plurality of counters in the associated configurable unit that can be used to indicate the status of an execution fragment. The status crossbar 550 includes outputs 552, 553 which are connectable to an increment crossbar 530 and a decrement crossbar 540.

The increment crossbar 530 of the configurable input circuit provides increment signals to each of the UDCs in the token store, and has inputs 557 connected to the configurable interconnect of the control bus, and inputs connected to the outputs of the status crossbar 550. Thus, each UDC has an increment signal based on a configurable selection of outputs from the status crossbar 550 and from the configurable interconnect inputs 557. The increment crossbar also has an input connected to receive a barrier token on line 552 generated by barrier logic 520 as discussed below.

The decrement crossbar 540 of the configurable input circuit provides decrement signals to each of the UDCs in the token store, and has an input 558 (or inputs) connected to the configurable interconnect of the control bus, and inputs connected to the 552, 553 of the status crossbar 550. Thus, each UDC has a decrement signal based on a configurable selection of outputs from the status crossbar 550 and from the configurable interconnect inputs 558. The decrement crossbar also has an input connected to receive a barrier token on line 552 generated by barrier logic 520 as discussed below.

The control barrier logic unit includes enable logic 500 including a configurable enable mask 503 which generates an enable signal on line 502 for connection to an associated configurable logic unit based on a configurable combination of the signals in the token store and status signals from the associated configurable logic unit. For example, the enable signal on line 502 can be provided to the control block 470 of FIG. 4, which can include logic to generate control signals for the PCU utilizing the enable signal on line 502 to start and stop execution fragments. The inputs to the enable logic 500 include status signals on line 501 from the associated configurable unit, such as FIFO not empty signals, and the like. Also, inputs to the enable logic 500 can include the outputs (e.g. 513) of the token store. The enable signal on line 502 therefore can be generated based on a configurable combination of the outputs of the token store. Also the enable signal on line 502 can be generated based on the configurable combination of the outputs of the token store and status signals from the associated configurable unit.

The control barrier logic unit includes barrier token logic 520 including a configurable barrier mask 521 which generates a barrier token on line 522 based on a configurable combination of the signals on lines 513 stored in the token store. The barrier token on line 522 is fed back as a feedback signal to the decrement crossbar 540, usable to reset the token store, for example. Also, the barrier token on line 522 is applied as an input to the increment crossbar 530 in this example, usable as a condition for setting a value in the token store.

The control barrier logic unit includes an output crossbar 560. The inputs to the output crossbar in this example include the barrier token on line 522, and status signals output by the status crossbar 550. Other inputs can be provided to the output crossbar 560 as well in other implementations. The output crossbar is configurable to apply the barrier token from line 522 and other signals to selected lines 561 on the configurable interconnect. The selected lines 561 on the configurable interconnect can be configured in a signal route that supplies the barrier token as an input (e.g. input 557) of another control barrier logic unit in the control barrier network of the configurable logic array. The selected lines 561 on the configurable interconnect can be configured in a signal route that supplies a status signal from one of the configurable units as an input (e.g. input 557) of another control barrier logic unit in the control barrier network of the configurable logic array.

Utilizing a control barrier logic unit like that of FIG. 5, the barrier operation works as follows. Each unit can be configured to implement a barrier across all the signals that can increment the UDCs. This includes the external control inputs from the control bus sourced from outside the associated configurable unit, and internal status signals like counter done signals sourced from inside the associated configurable unit. To implement a barrier across a subset of these signals, the configuration file reserves one zero-initialized UDC in the token store for each signal in the subset. The crossbars are configured to route the required signals to their respective UDCs. Next, a barrier mask is configured to select the reserved UDCs. The mask selects the UDCs that participate in an AND tree. The output of the AND tree is a 1-bit barrier token which, for example, goes high when all the UDCs in the mask have a value greater than zero. The barrier token can be configured to decrement all the UDCs participating in the barrier. This ensures that the barrier signal is high for only one cycle for every set of input tokens, thus producing one output token. The resulting barrier token is sent out on the control output by programming the "out" crossbar. This token can then be used as required by the program, e.g., input to the next stage of computation, or to the next barrier node, etc. In some cases, the barrier token may have to be sent to the node locally as well. To facilitate this use case, the barrier token is also an entry into the increment Xbar which can increment other UDCs. In this configuration, the barrier token is used for the purposes of resetting the token store. In other embodiments, different signals can be used for that purpose. Also, the barrier token can be used to reset only one bit, or only some of the bits, in the token store, rather than all bits.

This provides maximum flexibility to software to implement barriers close to the consumer to better utilize resources.

Control tokens from multiple sources in an array of configurable units often need to be synchronized at a barrier, where a single token (control pulse) is produced after receiving one token from each source. This barrier requirement is shown pictorially by the example of signal routing in FIG. 6 which can be implemented using control barrier logic units as described herein.

Figure 6:
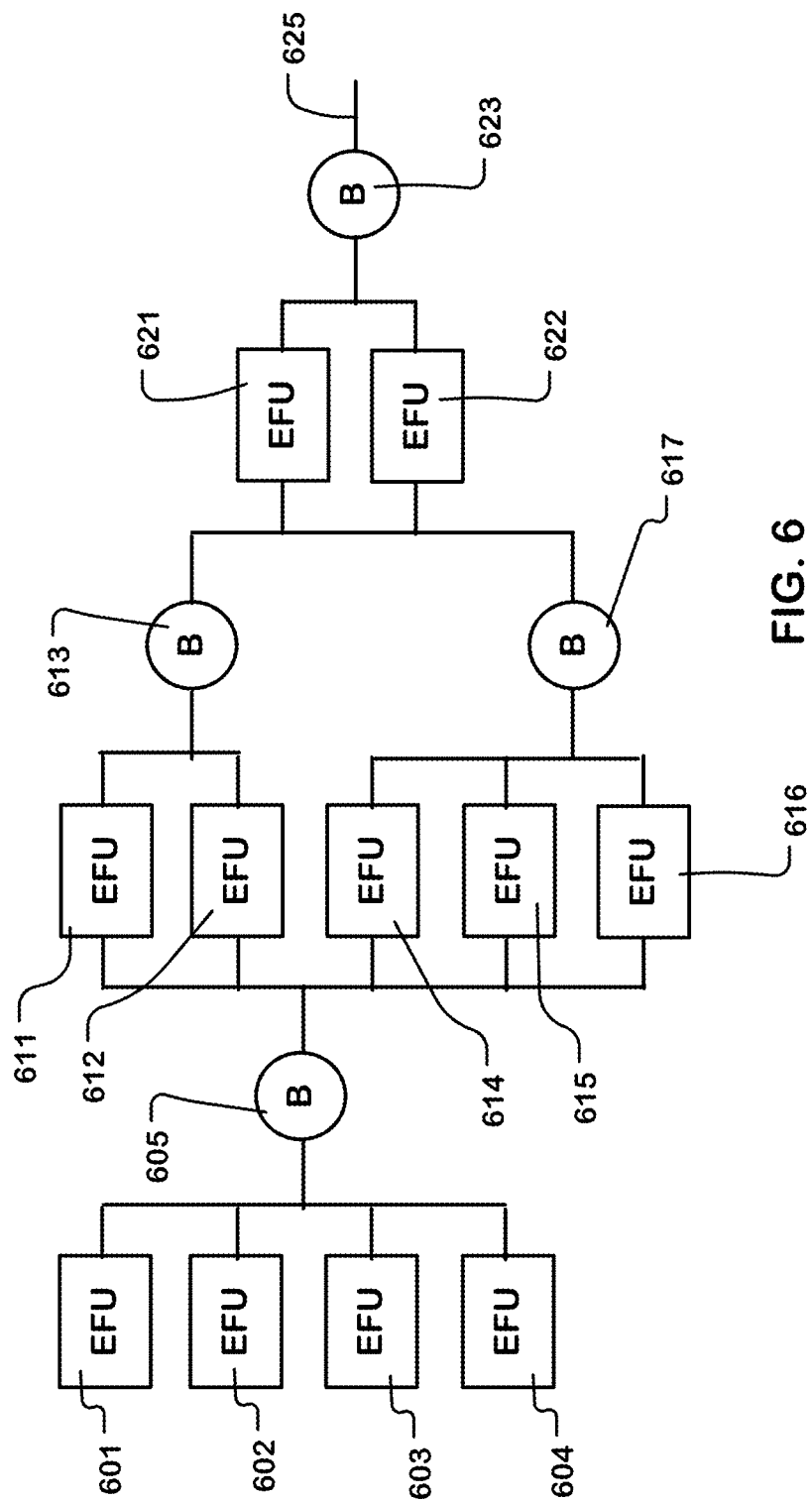
FIG. 6 illustrates an example of a configuration of control barriers that can be implemented using a control barrier network as described herein.

In FIG. 6 configurable units including configurable logic units are referred to as execution fragment units EFUs. The network includes 3 layers of EFUs. The first layer includes 4 EFUs (601-604) having outputs that are combined to form a first level barrier 605. Control barrier logic associated with each can be configured to produce a barrier token which is routed to a second level including EFU 611 and EFU 612 having outputs which are combined to provide a barrier 613, and EFUs 614-616 having outputs which are combined to provide a barrier 617. In one configuration, the control barrier logic associated with EFUs 611 and 612 is configured to generate enable signals for the EFUs 611 and 612 based at least in part on the barrier tokens from EFUs 601-604, and to produce barrier tokens on their control outputs corresponding with barrier 613. Likewise, the control barrier logic associated with EFUs 614-616 is configured to generate enable signals for the EFUs 614-616 based at least in part on the barrier tokens from EFUs 601-604, and to produce barrier tokens on their control outputs corresponding with barrier 617. The barriers 613 and 617 can be implemented by control barrier logic in a third level of EFUs, including EFU 621 and EFU 622, which are combined to provide a barrier 623. The barrier 623 can be applied to a next level, as indicated by line 625. As can be seen, a variety of barrier network configurations can be implemented in each level of the control barrier network shown in FIG. 6. For example the first level in FIG. 6 comprises a one level, 4-ary control barrier tree.

Figure 8:
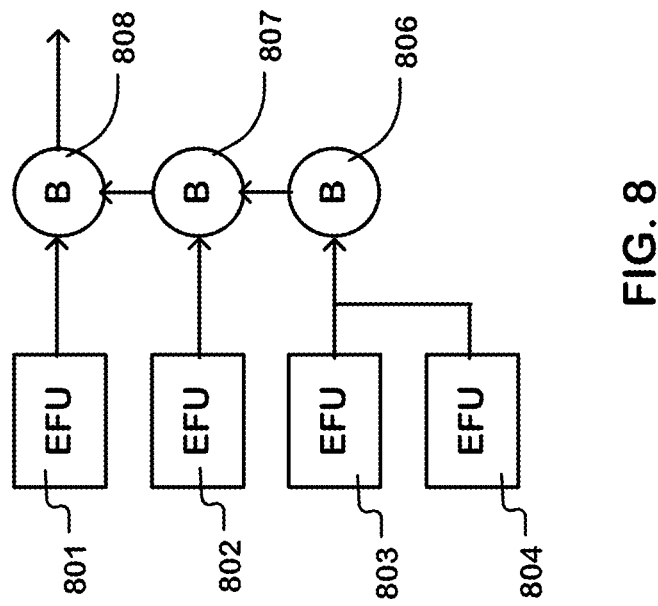
FIG. 8 illustrates another example of a signal route that can be implemented using a control barrier network as described herein.
Figure 7:
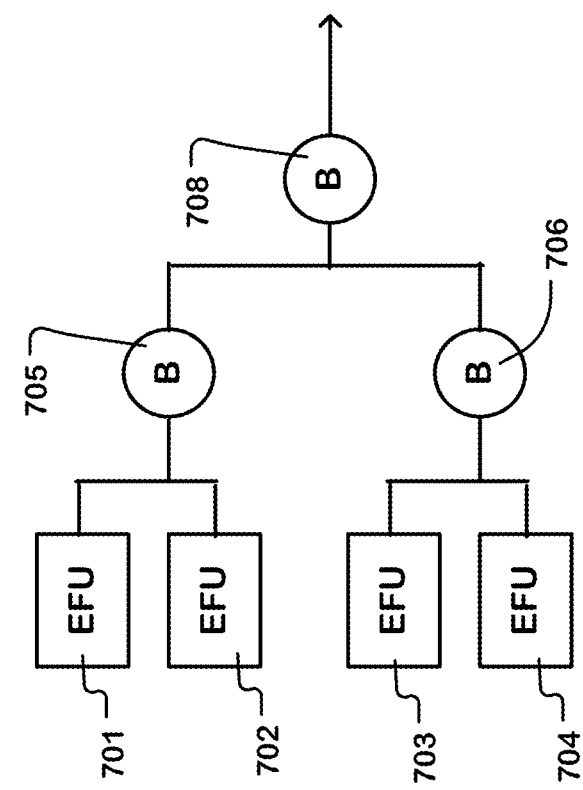
FIG. 7 illustrates an example of a signal route that can be implemented using a control barrier network as described herein.

As examples, FIGS. 7 and 8 illustrate other barrier network configurations across four units that can be formed by routing signals using control barrier logic units as described herein. FIG. 7 illustrates a 2-level, binary tree including four EFUs (701-704) which are combined to form barriers 705 and 706 at a first level, and an output barrier 708 at the second level. FIG. 8 illustrates a 3-level, unitary barrier tree, or a chained barrier, including four EFUs (801-804), in which EFUs 803-804 are combined to form barrier 806, EFU 802 is combined with the output of barrier 806 to form barrier 807, and EFU 801 is combined with the output of barrier 807 to form barrier 808.

A reconfigurable data processor comprises an array of processing units arranged to perform execution fragments of a data processing operation. A control barrier network is coupled to processing units in the array. The control barrier network comprises a control bus configurable to form signal routes in the control barrier network, and a plurality of control barrier logic units having inputs and outputs connected to the control bus and to the array of processing units. The logic units in the plurality of logic units are configurable to consume source tokens and status signals on the inputs and produce barrier tokens on the outputs based on the source tokens and status signals on the inputs. Also, the logic units can produce enable signals for the array of processing units based on the source tokens and status signals on the inputs.

The control barrier network technology described herein is suitable for implementation with CGRA devices. Also, it can be utilized with other types of processing systems that comprise an array of processing units that can benefit from coordination among execution fragments distributed among the array.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims. What is claimed is:

The invention claimed is:

1. A processing system, comprising:
    a logic unit in an array of processing units, the logic unit configurable to consume source tokens and a status signal and to produce barrier tokens and an enable signal based on the source tokens and the status signal.

2. The processing system of claim 1, further configured to comprise a control bus configurable by configuration data to form signal routes in a control barrier network coupled to processing units in the array of processing units.

3. The processing system of claim 2, wherein the control bus comprises a configurable interconnect configurable by the configuration data to connect lines on the control bus carrying barrier tokens produced on the outputs of logic units as source tokens to inputs of logic units that consume source tokens.

4. The processing system of claim 2, wherein the processing units in the array of processing units are configurable by the configuration data to execute execution fragments.

5. The processing system of claim 2, wherein the control bus is configurable to form signal routes connecting the output of one logic unit in the plurality of logic units as a source token to inputs of more than one logic unit in the plurality of logic units.

6. The processing system of claim 2, wherein the control bus is configurable to form signal routes providing source tokens sourced from more than one logic unit in the plurality of logic units to inputs of one logic unit in the plurality of logic units.

7. The processing system of claim 2, the logic unit comprising:
    a token store having inputs and outputs;
    a configurable input circuit configurable to connect selected lines in the control bus and a status signal line of the processing unit to inputs of the token store; and
    a token output circuit configurable to provide a barrier token to the control bus in response to a first configurable combination of the outputs of the token store.

8. The processing system of claim 2, the logic unit comprising:
    a token store having inputs and outputs;
    a configurable input circuit configurable to connect selected lines in the control bus and a status signal line of the processing unit to inputs of the token store;
    a token output circuit configurable to provide a barrier token to the control bus in response to a first configurable combination of the outputs of the token store;
    a feedback circuit configurable to provide a feedback signal in response to a second configurable combination of the outputs of the token store, to clear the token store; and
    an enable circuit to provide the enable signal to the processing unit in response to outputs of the token store.

9. The processing system of claim 2, comprising a data bus interconnecting the processing units in the array of processing units, and separate from the control bus.

10. The processing system of claim 9, wherein the data bus comprises a packet switched network.

* * * * *